Sept. 21, 1948.  B. C. CRANDALL  2,449,881
VENTURI RING MACHINE
Filed July 8, 1946  3 Sheets-Sheet 1
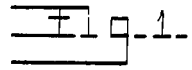
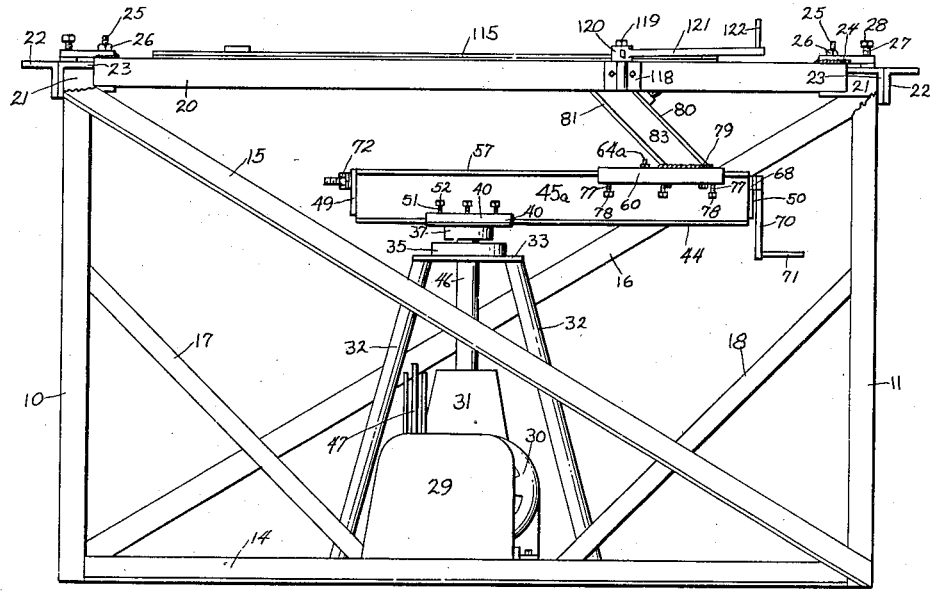
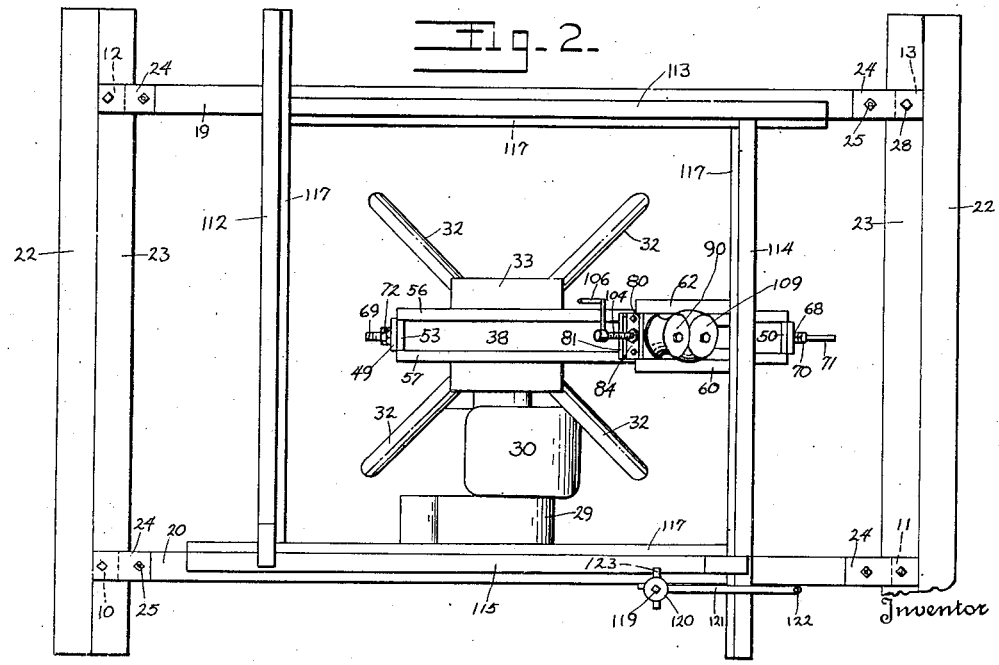
Inventor
B. C. CRANDALL
By Kimmel & Crowell
Attorneys Sept. 21, 1948.     B. C. CRANDALL     2,449,881
VENTURI RING MACHINE
Filed July 8, 1946     3 Sheets-Sheet 2
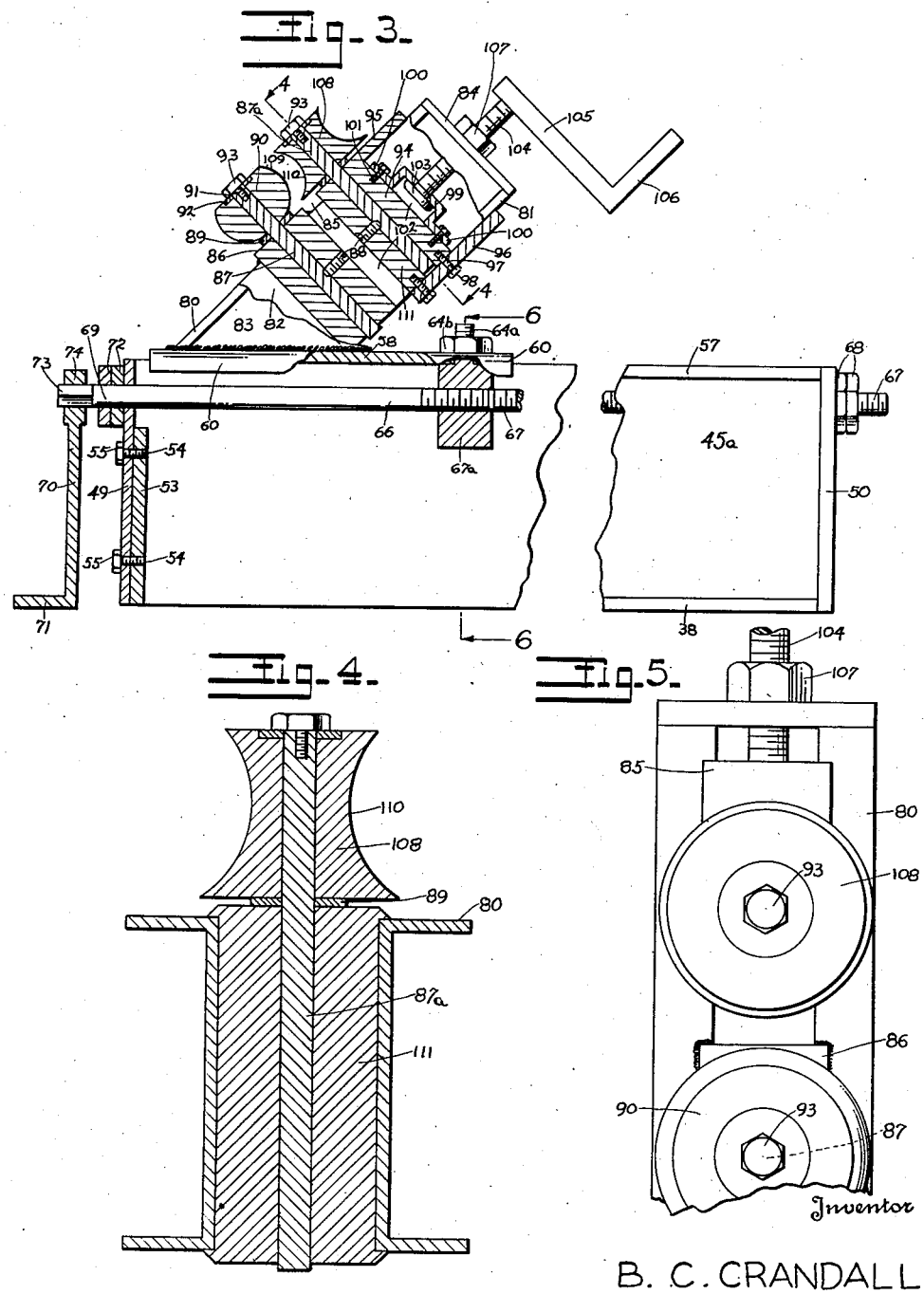
B. C. CRANDALL
By Kimmel & Crowell
Attorneys Sept. 21, 1948.    B. C. CRANDALL    2,449,881
VENTURI RING MACHINE
Filed July 8, 1946    3 Sheets-Sheet 3
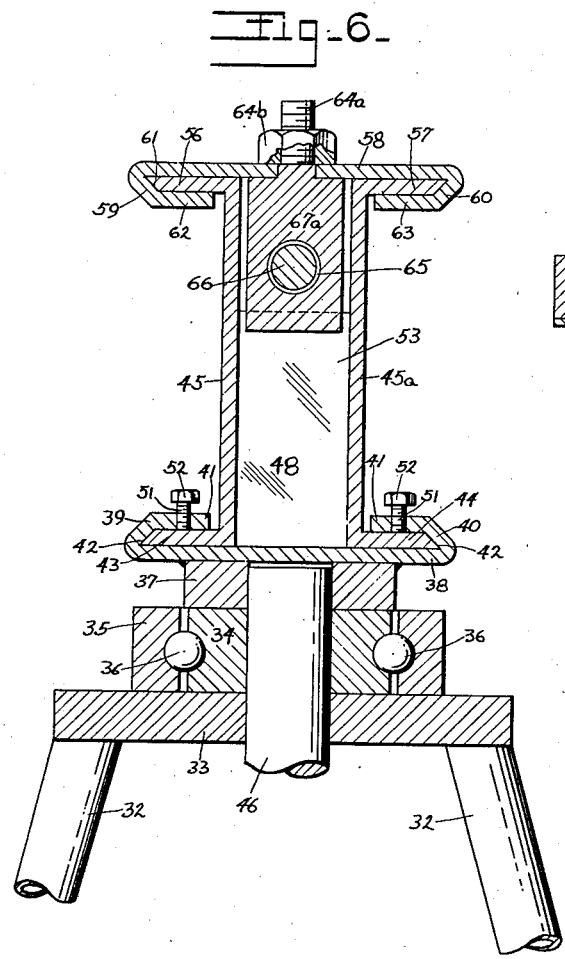
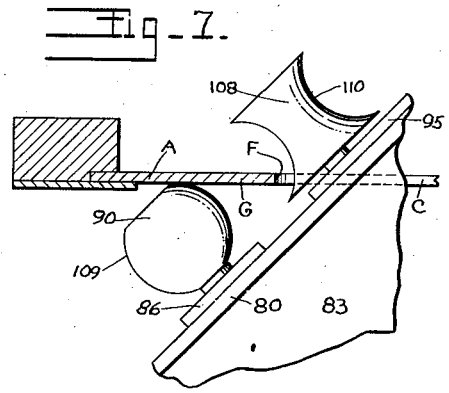
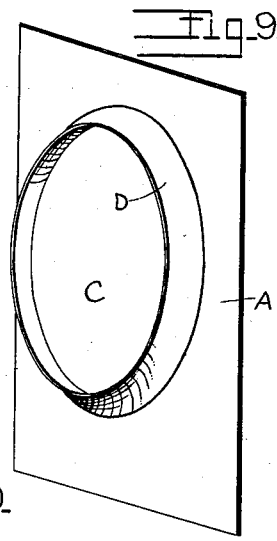
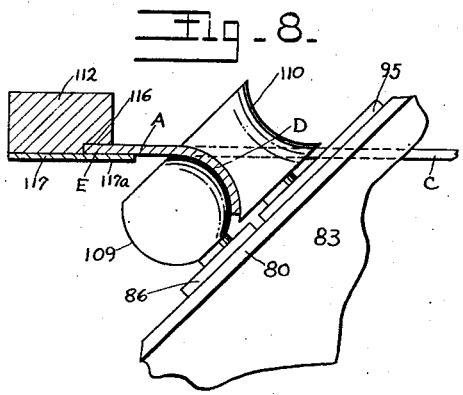
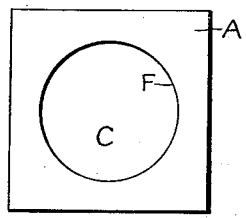
Inventor
B. C. CRANDALL
By Kimmel & Crowell
Attorneys Patented Sept. 21, 1948

2,449,881

UNITED STATES PATENT OFFICE 2,449,881

VENTURI RING MACHINE

Bee Carl Crandall, Memphis, Tenn.

Application July 8, 1946, Serial No. 682,111

1 Claim. (Cl. 153—29)

The present invention relates to improvements in machinery and more particularly to a machine for turning out a Venturi ring from a flat metal sheet to any desired shape and curvature.

One of the objects thereof is to provide a simple, efficient and inexpensive machine for the production rapidly and accurately of baffle rings upon the housings of ventilating fans and the like apparatus.

Another object thereof is to provide a sturdy, dependable machine the parts of which are so shaped, arranged and caused to function that they will upset and crimp the marginal or perimetral edge of an opening of a sheet metal plate or body in such a manner as to impart thereto the Venturi ring formation.

Another object thereof is to provide a machine that requires only manual positioning of a metal sheet thereupon and clamping it in centered position with respect to the ring forming mechanism thereof, and turning on of a switch for effecting the purpose of crimping the Venturi ring upon the edge of the opening in the sheet.

A further object thereof is to provide mechanism for adjusting the ring forming rolls in such a manner that they may be engaged with the edge of the opening in the metal sheet where the ring is to be formed, regardless of the size or diameter of the opening.

A still further object thereof is to provide, in a machine of the character described, improved means for supporting the shaping rolls thereof as the rolls follow their cycle of movement around the edge of the opening in the metal sheet where the Venturi ring is to be formed or similar bead.

Another object is to provide, in a machine of the kind described, improved means for centering the shaping rolls with respect to the opening in the sheet metal blank for the purpose of assuring that various sizes of rings and various shapes thereof may be produced in a minimum period of time.

Another object thereof is to provide, in a machine of the kind described, improved means for making necessary adjustments in the carrier for the shaping rolls with respect to the metal sheet.

With the above and other objects in view, my invention consists in the combination, arrangement and details of construction set forth in the drawings and specification and then more particularly pointed out in the appended claim.

In the drawings,

Wherein similar characters designate similar parts throughout the views,

Figure 1 is a side elevation of my invention,

Figure 2 is a top plan view thereof,

Figure 3 is a fragmentary detail view, in side elevation, of the roll carrier, partly in section, Figure 4 is a cross sectional view of the fluted roll holder, Figure 5 is a fragmentary end view of the roll carrier, Figure 6 is a fragmentary exaggerated view, in cross section, of the turntable and mounting thereon, Figure 7 is a fragmentary detail view showing the shaping rolls in open position, Figure 8 is a view similar to Figure 7, but showing the rolls in closed relation, Figure 9 is a perspective view of a Ventura ring formed plate, and Figure 10 is a plan view of the metal sheet in the condition it is in when fed into the machine.

In the drawings, which are merely illustrative of my invention, all the parts thereof are made to appear.

A rectangular framework is provided for supporting all parts of the machine. It is an open frame composed of brace bars and sills. Angle iron bars are made use of. The angle iron uprights are four corners of the frame. Oppositely arranged longitudinal angle iron sills 14 are connected at the base of the frame and constitute the base mounting thereof, being secured at their opposite ends to the uprights. A pair of angle iron brace bars 15 and 16 extend in opposite diagonal relation of the frame, one of the bars connecting the diagonally opposite corners made by a sill 14 and an upright, on one side of the frame. The other bar extends diagonally of the frame and connects to the diagonally opposite corners of the frame made by the upright and sill 14 on the other side of the frame.

A pair of short diagonal brace bars 17 and 18 are also provided. The bar 17 connects with sill 14 at one point and the upright 10 or 12, at another point. Diagonal bar 18 similarly connects at one point with sill 14 and at another point with the upright 11 or 13.

A pair of horizontally disposed top sills 19 and 20 are provided, which connect with the upper ends of the four uprights 10, 11, 12 and 13. Seats 21 are formed at the upper ends of these uprights, making angle iron rims 22 and 23 at opposite ends of the frame. These angle iron rims are welded together and provide a marginal shelf upon which the top sills 19 and 20 are positioned supportedly. Cleats 24 are also provided. Screw bolts 25 are tapped into the top sills and into these cleats, and nuts 24 screw home on them to clamp the sills upon the cleats. Bolts 27 in turn secure the cleats in position upon the seats 21, having the heads 28.

Inside of the frame thus described, and preferably arranged centrally thereof is a stand or pedestal. This stand or pedestal surrounds a power generating device. The said device is composed of a transmission case 29 secured upon the flooring upon which the frame is mounted. This transmission case connects with the electric motor 30 which imparts power to the gearing thereof. A shaft centering case 31 extends upright from the motor 30, in which projects upwardly a shaft 46. On the top of this shaft 46 is a turntable 37. The pedestal is composed of a circular series of upwardly convergent posts or legs 32, being preferably four in number as shown in Figure 4, spaced at equal distances apart from each other. The top horizontal plate 33 resting upon the upper ends of the posts operatively provides a seat for the turntable 37 to be mounted on. The two annular sections 34, 35 of an anti-friction race rest directly upon the top plate 33 of the pedestal. Anti-friction balls 36 are located between these sections in a horizontal pane and the upper end of the shaft 46 extends and is operatively fitted to race section 34.

The turntable 37 carries a track member of sheet metal designated 38, which completes the pedestal proper. The case of this track member 38 is formed with oppositely disposed marginal angular beads 39, 40, which then are bent back terminally in parallel relation to the base 38, to provide the confining flanges 41. The beads provide track grooves 42.

Shaping rollers are provided as a means of producing the Venturi ring D over the edge F of the cylindrical opening C made in the metal sheet or blank A. These rolls have to be set in connection with the work. The roll setting means will now be described. Oppositely disposed flanges 43, 44 are formed at the base of two elongated plates 45, 45a, which extend in upright parallel relation to form the opposite sides of a box or carrier. The number 47 designates the gear shift levers of the machine transmission case 29.

The interior of the box of which the side walls are composed of the plates 45, 45a, is designated 48. The end walls which close this box are denoted as 49, 50. Set screws 51 having heads 52 are employed to adjustably lock the box in adjustable position in the track of the pedestal. The set screws are tapped through the flanges 41 and engage the flanges 43, 44 of the box. In Figures 6, 2, and 3 it will be seen that a spacer plate 53 is secured to the end wall 49 of the box by means of fasteners or screws 54 having heads 55. The screws engage this spacer plate with the heads abutting the end wall 49. The width of this spacer plate is less than that of end wall 49 which it overlies on its inner face. The end edges of the side wall plates 45, 45a of the box abut the marginal edges of spacer plate 53 so that their outer faces are flush with the edges of end wall 49. The edges of spacer plate 53 and of side wall plates 45, 45a, are welded together or otherwise secured. This is also true of the other end wall 50 of the box.

A slide is mounted upon the top outturned flanges 56 and 57 formed upon the side plates 45, 45a. This slide has an inverted base 58 upon which are formed oppositely and inwardly inclining beads or marginal portions 59, 60. These beads are formed with flanges 62, 63 disposed parallel to the base 58, which are confining flanges. The beads provide grooves or tracks 61. This enables the slide thus formed to be adjusted along the length of the box.

Adapted to extend longitudinally of the box is a feed screw 66 having the threads 65 formed for the major portion of its length. The unthreaded portion of this screw enters the end wall 49, and the terminal of its threaded portion 67 comes out of end wall 50 where a pair of lock nuts 68 screw thereupon and abut the end wall 50. A crank 70 is fitted onto the end of the feed screw 66 having the operating handle 71. Lock nuts 72 engage the end of the feed screw adjacent end wall 49 also. In this way the feed screw 66 is held against longitudinal movement in the box.

The slide having the marginal portions 59, 60 also carries at its outer end an integral depending block 67a. This block had a threaded bolt 64a which projects through the case 58 of the slide, where a nut 65b is screwed upon it, as a means of clamping the block upon this slide. At the end of the feed screw 66, remote from end wall 50, it is formed of polygonal portion 73 over which the collar 74 of crank 70 is fitted operatively.

The particular mounting for the shaping rolls will now be described. Upon its base portion 79 rigidly secured upon the rear part of the slide is disposed the diagonally positioned holder for the shaping rolls. This holder inclines over towards the center of the box. The inclining side walls thereof are designated 82, 83, and the respective top and bottom walls thereof are denoted at 80, 81. The end wall therefor is designated 84. The four walls of this box-shaped holder may be rigidly secured to one another in any approved manner. The inclined wall 80 of this holder is formed with an elongated slot 85 indicated in Figure 5. A plate 86 is fixed upon the holder so as to overlie the inclined wall 80 thereof operatively. A shaft 87 is journaled in this plate or member 88 operatively so as to project beyond the wall 80 of the holder. A set screw 88 is tapped into member 86 and binds this shaft in position so it does not turn. A washer 89 surrounds the shaft 87, seating on plate 86, and a shaping roll 90 abuts upon this washer and is held against displacement from shaft 87 upon which it is loosely mounted by means of a set screw 91 tapped into shaft 87, with its head 93 crowding against a wear plate 92 countersunk into this roll 90. Roll 90 is formed peripherally with a convex surface 109.

A slide block of approved formation 111 has its body slidably mounted in the slots 85 formed in inclined plates 80 and 81 of the holder. It has a side flange 95 adapted to slide upon the plate 80 of the holder. A removable cover plate or like member 96 is secured to slidably overlap inclined plate 81. It is secured to slide block 94 by means of screws 97 the heads 98 of which abut the cover plate 96.

A saddle piece is secured upon the slide block 94. It consists of an offset part 99 which is formed with oppositely extending base flanges 100 secured by set screws 101 to the slide block, the heads of which screws are designated 103. The heads 103 abut the flanges 100 of the saddle piece. The channel 102 of this saddle piece has projecting thereinto the head 103 of a feed screw 104 which is threaded into a nut welded upon the part 99. A crank 105 is operatively fitted upon this feed screw 104 and it has an operating handle 106. Projecting into this slide block so as to be journaled therein is a shaft 87a, which has one end also projecting beyond plate 80 in the same direction as shaft 87. Mounted upon a washer 89, abutting this plate is the forming roll 108 which is formed with a peripheral fluted surface 110. This roll also has a countersunk wear plate 92 and is secured upon shaft 87a in the same way that roll 90 is secured upon its shaft 87.

On top of the frame are four picture frame arranged holding bars 112, 113, 114 and 115, Figure 2. In any operative manner they are designed to receive and hold and position the four right angular edges of a rectangular metal sheet A to enter its cylindrical or other shaped opening C directly over the box that carries the roll holder. Figure 8 illustrates how these bars may be formed. A metal bottom 117 secured to the bar projects beyond the bar transversely thereof to form a lip 117a. The bar has a kerf 116 cut thereinto its full length, which is in a plane with the plate 117. Two of the bars, preferably bars 112 and 115, may be made adjustable in any operative manner desired. A bracket 118 is secured to the top sill 20 as shown in Figure 1. In this bracket is journaled a pintle 119 upon which the collar end 120 of a clamping lever 121 is attached rigidly. An operating handle 122 is carried by this lever 120. Collar 120 carries clamping fingers 123.

In the position of the parts operatively, it will be seen from Figure 1 that the box having the base 38 has its major portion extending radially of one point of the turntable 37 and its minor portion projecting radially diametrically opposite to its major portion. It is obvious that adjustments will be made in the positions of the holder for the rolls 90 and 108 on the carriage formed by the box, and adjustments of this carriage or box itself made upon the turntable 37. This is rendered necessary by reason of the fact that the particular size of the metal sheet A that is to have a Venturi ring formed on it has to be considered as well as the size of its opening C. The particular shape of ring in cross section that may be desired is a matter of properly shaping the complemental perimetral surfaces of the two rolls 90 and 108. The holder for the rolls can be adjusted simply by taking hold of crank handle 71 and turning the crank 70 of the feed screw 66. The direction in which the crank is turned determines the direction in which the carriage or box will travel upon the turntable 37. Since this feed screw cannot move longitudinally, it turns in the slide block 67a of the slide which carries the rolls. In this way the rolls can be properly centered or registered with respect to the edge F of the opening C in the sheet metal blank A. In order to register the carriage itself with relation to the dimensions of the sheet metal blank A, it is simply necessary to loosen the bolts 51 which clamp the carriage upon the track of the turntable, slide it in the proper direction for the proper distance and then tighten the hold of the bolts again. Similarly, the set screws or bolts 77 having the heads 78 may be loosened to allow the slide carrying the rolls 90 and 108 to be adjusted, and then these bolts can be tightened again and the slide finally locked in adjusted position. It will be seen that any desired registration of the machine is permitted which is desirable to cause the rolls to engage the edge of the opening in the metal blank, while the carriage or box, in unison with the turntable and shaft 46 is making a slow but complete cycle of movement under the metal blank A and within the confines of the parts of the framework of the machine.

The sheet metal blank A has first been set against the holding bars 112, 113, 114 and 115 with its edges entering the kerfs 116 in these bars. The bar 115 is caused to clamp itself against the sheet by operating lever 121 which when turned in the proper direction, while being held in the hand of the workman, turns collar 120 and makes its pin or finger 123 bind upon this bar to hold it from becoming disengaged from the sheet which it holds down upon the frame.

The metal sheet being thus clamped down upon the top of the frame along its marginal edges, the main body thereof extends across the open space in the framework. The carriage having been adjusted as explained, the holder slide for the rolls will now be adjusted further. The practice here is to move the slide on the carriage to that point along its length where roll 90 will engage the under surface of the marginal portion G of the metal sheet A as shown in Figure 7, while permitting roll 108 to project into the opening C of this sheet, for engagement with the other side of this same marginal portion of the sheet.

In operation the roll 90 will be caused to contact the marginal portion G of the opening C of the sheet A at a corner so that its entire peripheral cross section 109 will be bridged across from the sheet A over to the plate 80 of the slide holding it. At this time the bolts 77 will be locked tightly and securely against the flanges 56, 57 of the carriage or box. This having been done, and the workman having set the motor 30 in operation, and while he clamps the sheet by means of lever 121 so it remains rigidly in position upon the frame, with his other hand the workman now manipulates crank handle 106. His purpose is to begin the operation of crimping and upsetting the rim or marginal portion G of the metal sheet A to form the Venturi ring thereupon. He turns this operating crank handle 106 in the right direction to cause the slide block 111 to advance with roll 108 towards the edge F of opening C in the metal sheet A. He keeps on turning this crank until the roll 108 will thoroughly perform its mashing and shaping operation. This it does by riding forcibly down upon marginal portion G of the sheet which, as shown in Figure 7, projects away from roll 90 under the diagonally disposed flute 110 in roll 108. As the roll 108 is forcibly contacted with marginal portion G of the sheet A, the carriage or box and the slide carrying both rolls are being slowly, due to the gearing in gear case 29, carried around in a circle or cycle of movement with respect to the circular edge of the opening C. The contact between the two rolls with the metal sheet A, as this rotating movement of the carriage occurs, causes these rolls to rotate also. In doing so, as the two rolls are clamped together, the marginal portion G of sheet A is crimped, upset and mashed against the convex surface 109 of forming roll 90 as shown in Figure 8. This makes this marginal portion G conform exactly to the convex surface of roll 90 upon one side where it encounters the fluted surface 110 of roll 108, and to the concave surface of roll 108 on its other side due to be contacted by the convex surface of roll 90. As soon as the carriage has made a complete revolution, the complete Venturi ring shown in Figure 9 will be formed.

I do not mean to confine myself to the exact details of construction herein disclosed but claim all variations falling within the purview of the appended claim.

What I desire to claim is:

A sheet metal rolling device comprising a frame, a pedestal within said frame and terminating below the upper plane thereof, clamping means on said frame for clamping an apertured sheet metal work piece above said pedestal, a vertical shaft in said pedestal, a flat supporting member fixed on the upper end of said shaft, an elongated carriage, means securing said carriage on said supporting member for longitudinal adjustment relative thereto, a pair of work engaging rollers, means supporting said rollers on said carriage for adjustment along the length thereof, means for varying the disposition of said rollers one to the other and vertically relative to said work piece, and means for rotating said shaft whereby said rollers are rotated about the axis of said shaft in engagement with the inner edge of said apertured sheet.

BEE CARL CRANDALL.

REFERENCES CITED

The following references are of record in the file of this patent:

UNITED STATES PATENTS

| Number | Name | Date |
|---|---|---|
| 2,146,949 | Flagler | Feb. 14, 1939 |
| 2,219,207 | Goldthwaite | Oct. 22, 1940 |